United States Patent
Wai et al.

(10) Patent No.: US 8,975,878 B2
(45) Date of Patent: Mar. 10, 2015

(54) SWITCHED RELUCTANCE GENERATOR INTEGRATED CONTROLS

(75) Inventors: Jackson Wai, Dunlap, IL (US); Thuong Le, Edwards, IL (US); Adam Braun, Vandalia, IL (US); Jesse Gerdes, Dunlap, IL (US); James Siegle, Peoria, IL (US); Mark Hartman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1112 days.

(21) Appl. No.: 12/977,973

(22) Filed: Dec. 23, 2010

(65) Prior Publication Data

US 2012/0161723 A1 Jun. 28, 2012

(51) Int. Cl.
*H02P 9/00* (2006.01)
*H02P 11/00* (2006.01)

(52) U.S. Cl.
USPC .................................. 322/44; 322/20; 322/29

(58) Field of Classification Search
CPC ............ B60L 11/08; B60L 15/20; B60W 2510/0638; B60W 2050/0075; E02F 9/2075; F02B 63/042; F02D 29/06; Y02T 10/6217
USPC .......................... 322/29, 44, 20; 700/287, 290
See application file for complete search history.

(56) References Cited

U.S. PATENT DOCUMENTS

| | | | | |
|---|---|---|---|---|
| 4,498,016 A | * | 2/1985 | Earleson et al. | 290/40 R |
| 4,701,690 A | * | 10/1987 | Fernandez et al. | 322/28 |
| 5,496,227 A | * | 3/1996 | Minowa et al. | 477/62 |
| 5,563,488 A | | 10/1996 | Stephenson et al. | |
| 5,892,348 A | | 4/1999 | Norman et al. | |
| 6,472,842 B1 | | 10/2002 | Ehsani | |
| 6,819,008 B2 | | 11/2004 | Kaplan et al. | |
| 6,982,537 B2 | | 1/2006 | Islam et al. | |
| 7,071,659 B1 | | 7/2006 | Torrey et al. | |
| 7,378,808 B2 | | 5/2008 | Kuras et al. | |
| 7,511,449 B2 | | 3/2009 | Speckhart et al. | |
| 7,701,079 B2 | | 4/2010 | O'Gorman et al. | |
| 7,755,308 B2 | | 7/2010 | Kayikci et al. | |
| 2002/0113439 A1 | * | 8/2002 | Thomas et al. | 290/40 A |
| 2005/0279329 A1 | * | 12/2005 | Pierpont et al. | 123/478 |
| 2006/0012344 A1 | * | 1/2006 | Velhner et al. | 322/23 |
| 2007/0251236 A1 | | 11/2007 | Barthelet et al. | |
| 2008/0272721 A1 | | 11/2008 | Mayes et al. | |
| 2010/0066288 A1 | * | 3/2010 | Williams | 318/434 |
| 2010/0087994 A1 | * | 4/2010 | Bai | 701/54 |

* cited by examiner

*Primary Examiner* — Julio Gonzalez Ramirez
(74) *Attorney, Agent, or Firm* — Miller, Matthias & Hull LLP (57) ABSTRACT

A method of controlling a generator (110) of an electric drive (104) associated with an engine (102) is provided. The method may determine an operational state of the electric drive (104) based on a speed of the engine (102), and selectively engage one of a map-lookup control scheme (150) and a fixed-theta off control scheme (152) for operating the generator (110) based on the operational state of the electric drive (104).

9 Claims, 9 Drawing Sheets

SWITCHED RELUCTANCE GENERATOR INTEGRATED CONTROLS

TECHNICAL FIELD

The present disclosure relates generally to electric drive assemblies and machines, and more particularly, to systems and methods of controlling generators of electric drive assemblies and machines.

BACKGROUND

With the growing interest in energy conservation, increasingly more industrial work machines are supplied with electric drive assemblies for driving the work machine and operating its various tools or functions. Ongoing developments in electric drives have made it possible for electrically driven work machines to effectively match or surpass the performance of purely mechanically driven work machines while requiring significantly less fuel and overall energy. As electric drive assemblies become increasingly more commonplace with respect to industrial work machines, and the like, the demands for more efficient generators and techniques for controlling same have also increased.

A generator of an electric drive machine is typically used to convert mechanical power received from a primary power source, such as a combustion engine, into electrical power for performing one or more operations of the work machine. Additionally, a generator may be used to convert electrical power stored within a common bus or storage device into mechanical power. Among the various types of generators available for use with an electric drive assembly, switched reluctance (SR) generators have received great interest for being robust and cost-effective. While currently existing systems and methods for controlling SR generators provide adequate control, there is still room for improvement.

One technique for operating generators refers to predefined or preprogrammed control maps which suggest an ideal generator control profile based on the operational condition or state of the electric drive and associated machine. However, to implement such a map-lookup control scheme, the generator control profiles must take into consideration several possible events and conditions to which the generator and the electric drive must respond. Such control schemes may be adequate for steady state conditions, wherein engine or generator speeds are substantially constant and there are relatively small numbers of variables to preconceive and preprogram into a controller. With respect to transient states, however, wherein engine or generator speeds are fluctuating significantly, it is overly cumbersome and costly to take into consideration and preprogram all of the possible combinations of variables into a controller.

Accordingly, it is essential to provide more adaptive and efficient means for controlling generators of electric drive assemblies and machines. The disclosed systems and methods are directed at addressing one or more of the needs set forth above.

SUMMARY OF THE DISCLOSURE

In one aspect of the present disclosure, a method of controlling a generator of an electric drive associated with an engine is provided. The method determines an operational state of the electric drive based on a speed of the engine, and selectively engages one of a map-lookup control scheme and a fixed-theta off control scheme for operating the generator based on the operational state of the electric drive.

In another aspect of the disclosure, a method of controlling a generator of an electric drive associated with an engine is provided. The method provides a first signal for operating the generator based on a map-lookup control scheme, provides a second signal for operating the generator based on a fixed-theta off control scheme, determines an operational state of the electric drive based on output characteristics of the engine, and selectively enables one of the first and second signals for controlling the generator based on the detected operational state of the electric drive.

In yet another aspect of the disclosure, an adaptive control system for a generator of an electric drive is provided. The control system includes a converter circuit configured to communicate with one or more phases of a stator of the generator, and a controller in communication with the converter circuit and an engine associated with the electric drive. The controller is configured to determine an operational state of the electric drive based on at least a speed of the engine. The controller is also configured to engage one of a map-lookup control scheme and a fixed-theta off control scheme for operating the generator based on the operational state of the electric drive.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
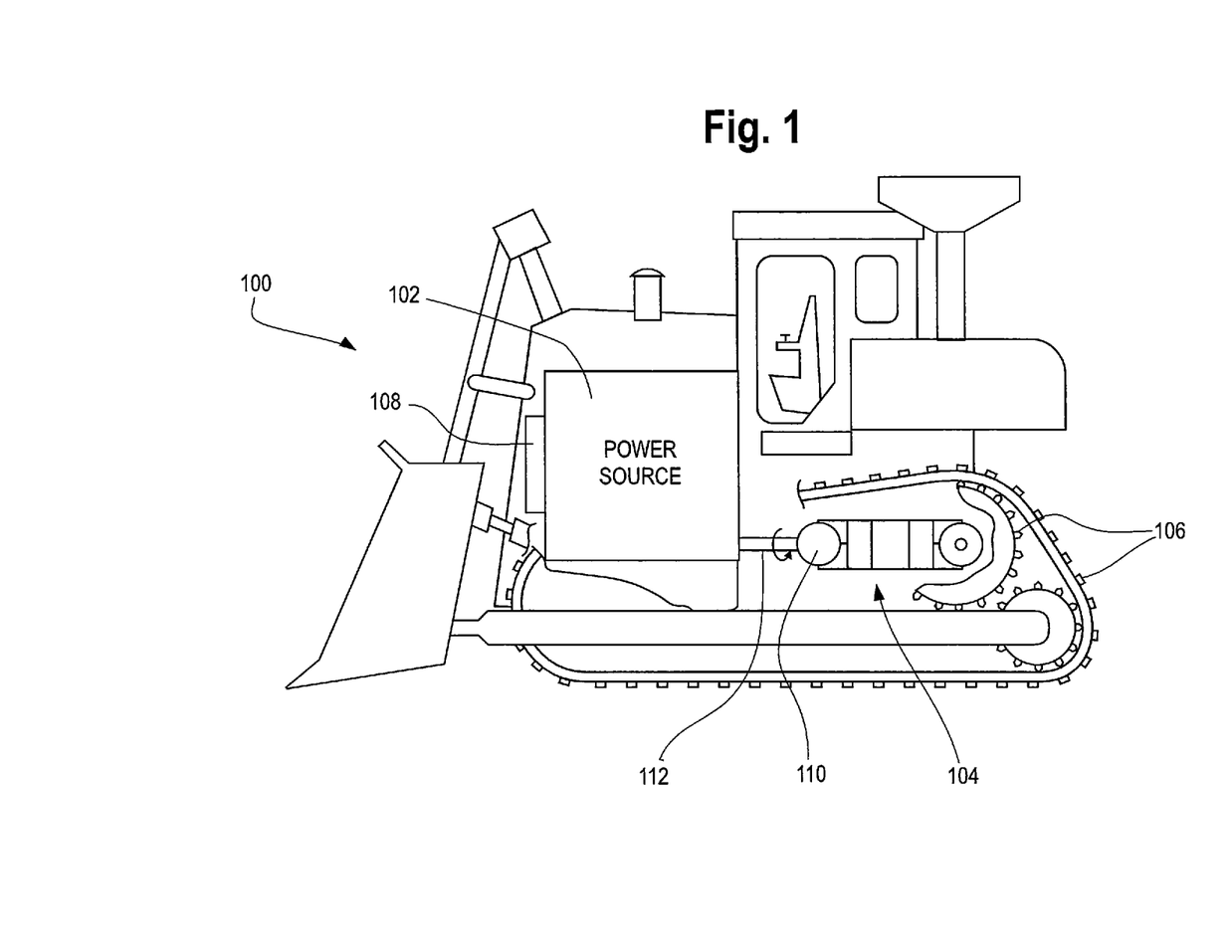
FIG. 1 is a diagrammatic view of a machine constructed in accordance with an exemplary embodiment of the present disclosure.

FIG. 1 diagrammatically illustrates a mobile machine 100 that may employ electric drive means for causing movement. More specifically, the machine 100 may include a power source 102 that is coupled to an electric drive 104 for causing movement via a traction device 106. Such a mobile machine 100 may be used as a work machine for performing a particular type of operation associated with an industry, such as mining, construction, farming, transportation, or any other suitable industry known in the art. For example, the machine 100 may be an earth moving machine, a marine vessel, an aircraft, a tractor, an off-road truck, an on-highway passenger vehicle, or any other mobile machine. The power source 102 of the electric drive 104 may include, for example, a diesel engine, a gasoline engine, a natural gas engine, or any other type of combustion engine commonly used for generating power. The electric drive 104 may also be used in conjunction with any other suitable source of power such as, for example, a fuel cell, or the like. The engine 102 may be configured to directly or indirectly transmit power to parasitic loads 108 via belts, hydraulic systems, and the like. The engine 102 may also be configured to mechanically transmit power to a generator 110 of the electric drive 104 via a coupling or axially rotating drive shaft 112.

Figure 2:
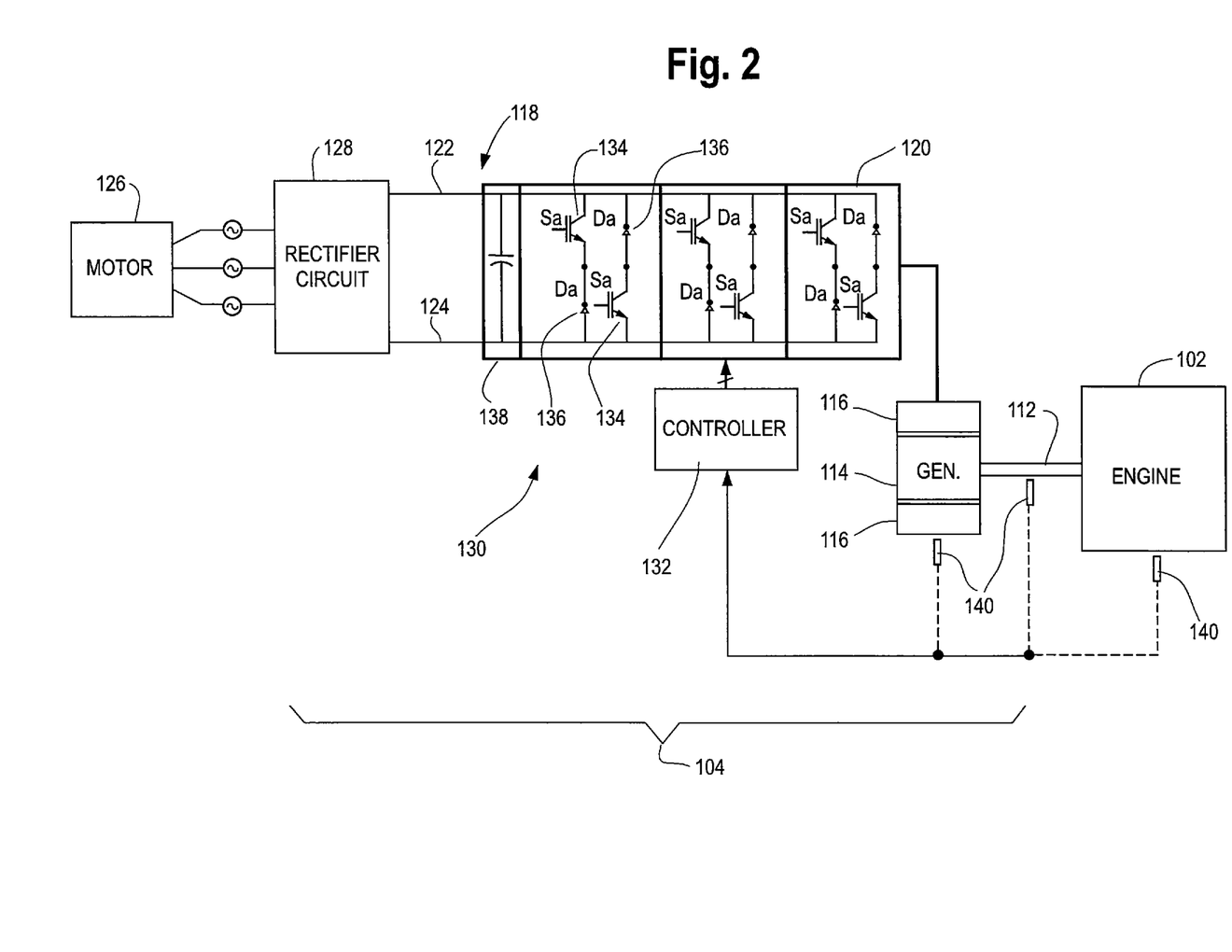
FIG. 2 is a schematic view of an exemplary embodiment of an adaptive control system as applied to a typical electric drive.

With reference to FIG. 2, the generator 110 of the electric drive 104 may be a switched reluctance (SR) generator, or any other suitable generator configured to produce electrical power in response to rotational input from the engine 102. As is well known in the art, the generator 110 may include a rotor 114 that is rotatably disposed within a fixed stator 116. The rotor 114 of the generator 110 may be rotatably coupled to an output of the engine 102 via the drive shaft 112, or in other related embodiments, via a direct crankshaft, a gear train, a hydraulic circuit, and the like. The stator 116 of the generator 110 may be electrically coupled to a common bus 118 of the electric drive 104 via a converter circuit 120. During a generating mode of operation, as the rotor 114 of the generator 110 is rotated within the stator 116 by the engine 102, electrical current may be induced within the stator 116 and supplied to the converter circuit 120. The converter circuit 120 may in turn convert the electrical signals into an appropriate direct current (DC) voltage for distribution to the various electrical loads or devices of the machine 100. Additionally, the generator 110 may be enabled to cause rotation of the rotor 114 in response to electrical signals that are provided to the stator 116 from the common bus 118, for instance, during a motoring mode of operation.

The common bus 118 may provide a positive line 122 and a negative or ground line 124 across which the common bus 118 may communicate a common DC bus voltage between one or more electrically parallel devices of the machine 100. For instance, the common bus 118 may communicate power supplied by the engine 102 and the generator 110 to one or more traction motors 126 for causing motion via a traction device 106. More specifically, the converter circuit 120 may provide a DC signal to be transmitted through the common bus 118 to a rectifier circuit 128, or the like, configured to convert the DC voltage to the appropriate alternating current (AC) signals for driving the one or more traction motors 126. The common bus 118 may also communicate the common DC voltage to other devices of the machine 100, such as a hybrid system, electrically driven pumps, electrically driven fans, or other accessory loads.

As shown in FIG. 2, the electric drive 104 may also be provided with an adaptive control system 130 for controlling the generator 110. The control system 130 may essentially include a controller 132 that is in communication with both the converter circuit 120 and the power source or engine 102 associated with a particular electric drive 104. The converter circuit 120 may include a series of transistors or gated switches 134 and diodes 136 for selectively enabling one or more phase windings of the generator 110. A three-phase switched reluctance generator 110, for example, may be driven using a converter circuit 120 with six switches 134 and six diodes 136 for selectively enabling or disabling each of the three phases of the generator 110. Each of the switches 134 may be enabled or disabled via gate signals, which may be supplied by the controller 132. Power to the converter circuit 120 may be provided by an external or secondary power source, such as provided by a battery, residual voltage stored in a capacitor 130 of the common bus 118, or any other suitable current limited DC power supply.

By communicating with the converter circuit 120 and the engine 102, the controller 132 may be configured to determine an operational state of the associated electric drive 104, and in turn, adaptively engage the appropriate control scheme for operating the generator 110. The controller 132 may be implemented using one or more of a processor, a microprocessor, a microcontroller, an electronic control module (ECM), an electronic control unit (ECU), or any other suitable means for providing electronic control of the generator 110. Furthermore, the controller 132 may be configured to operate according to a predetermined algorithm or set of instructions for operating the generator 110 based on characteristics of the engine 102 and/or the electric drive 104. Such an algorithm or set of instructions may be preprogrammed or incorporated into a memory of the controller 132 as is commonly used in the art.

Figure 3:
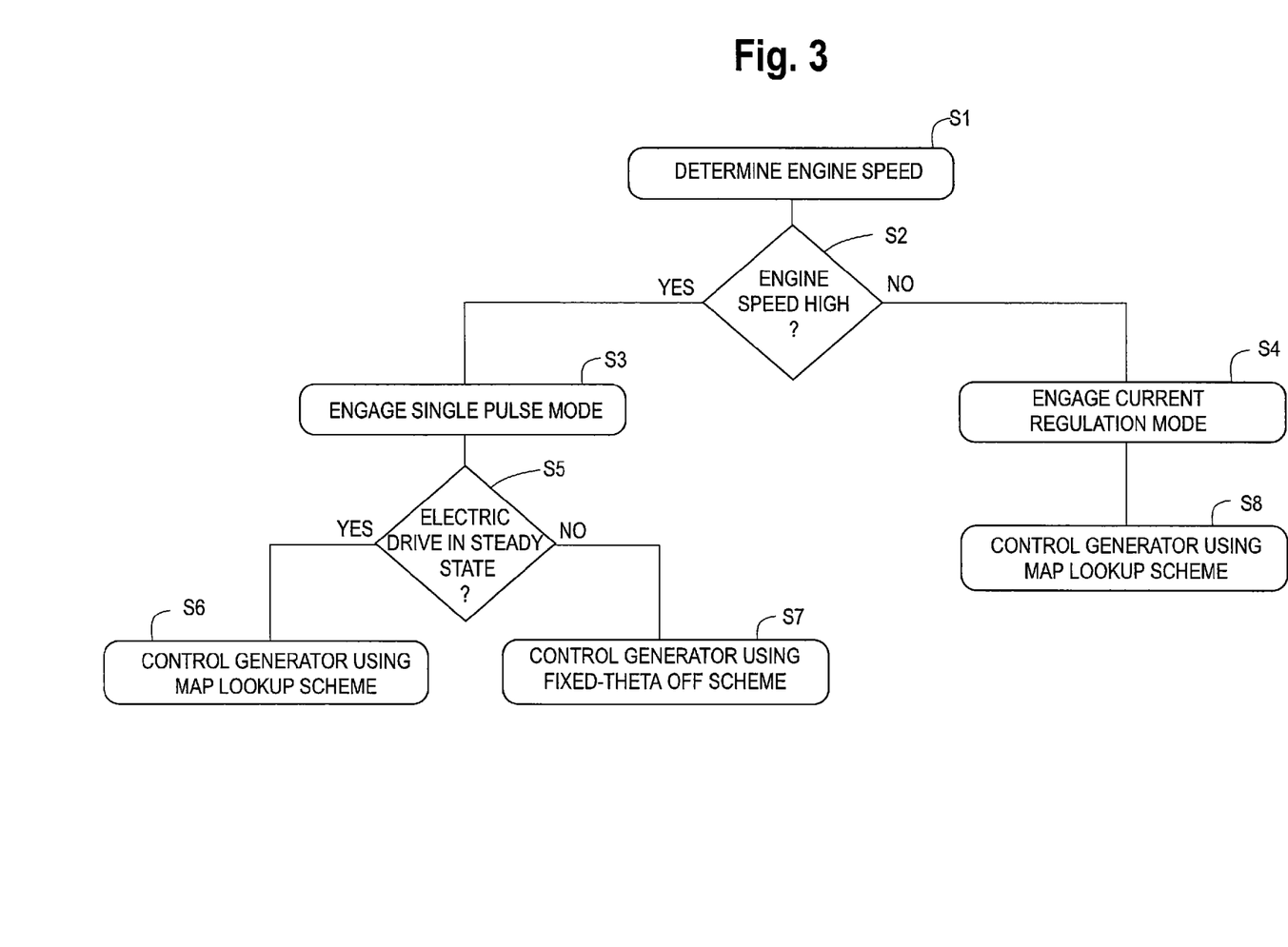
FIG. 3 is a flow diagram of a method of controlling a generator for an electric drive.

Referring now to FIG. 3, an exemplary method of controlling a generator 110 is provided having a plurality of steps that may be selectively performed by the controller 132, for example, during operation of the associated electric drive 104 and generator 110. In an initial step S1, the controller 132 may determine a rotational speed of at least one of the associated engine 102 and the generator 110. More specifically, the controller 132 may electronically communicate with one or more position and/or speed sensors 140, as shown in FIG. 2, disposed at an output of the engine 102 and/or at the rotor 114 of the generator 110. The sensors 140 may include encoders, proximity sensors, current sensors, or any other suitable sensor for providing an electrical signal which varies according to rotational displacement of the output shaft 112 of the engine 102, the rotor 114 of the generator 110, or the like. Based on the sensor signals and using known mechanical relationships of the engine 102 and/or the generator 110, the controller 132 may be preprogrammed to determine and track the effective rotational speed of the engine 102. In further modifications, the controller 132 may be configured to monitor the rate of change in the engine speed.

Figure 4:
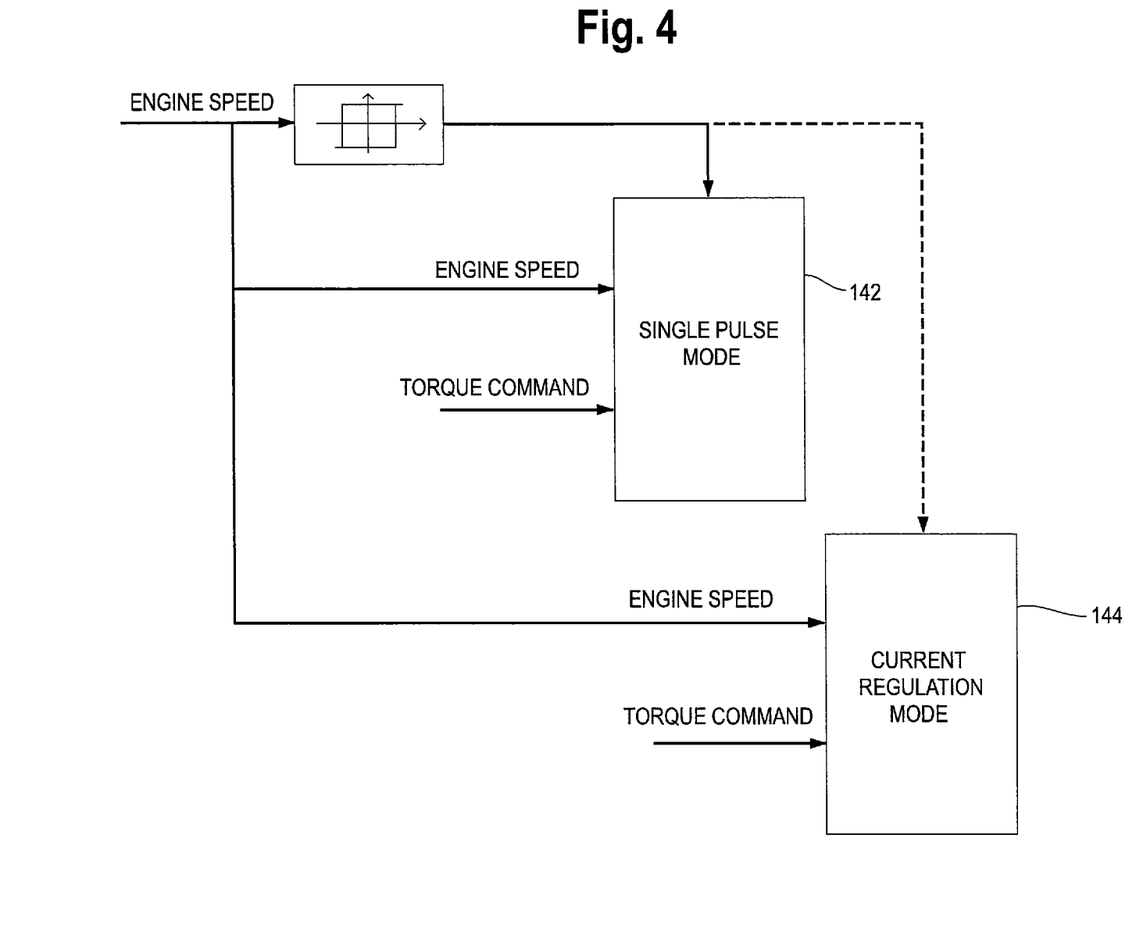
FIG. 4 is a schematic view of two possible modes of operating a generator of an electric drive.

As further illustrated in FIG. 4, based on the effective engine speed, the controller 132 may determine the appropriate mode for operating the generator 110 in a step S2. More specifically, the controller 132 may monitor and compare the engine speed with one or more predefined engine speed thresholds to determine if the engine speed corresponds to a relatively high engine speed, a nominal or mid-range engine speed, a relatively low engine speed, or the like. If the detected engine speed corresponds to a relatively high engine speed, the controller 132 may be configured to engage a single pulse mode 142 of operating the generator 110 in a step S3. Alternatively, if the detected engine speed corresponds to a nominal or a relatively low engine speed, the controller 132 may be configured to engage a current regulation mode 144 of operating the generator 110 in a step S4.

Figure 5:
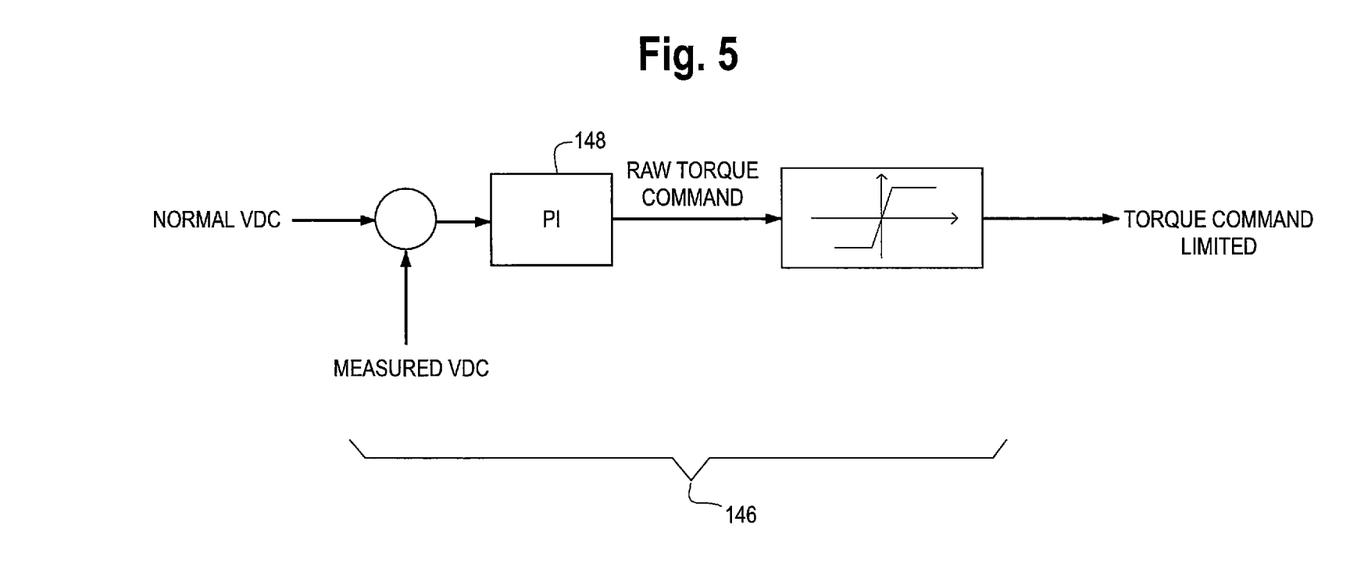
FIG. 5 is a schematic view of an exemplary closed-loop system as applied to the control system of FIG. 2.

As shown in FIG. 4, the controller 132 may additionally be configured to determine a torque command signal, which may be used during both single pulse and current regulation modes 142, 144, to provide more adaptive control of the generator 110. The torque command signal may be, for example, an adjusted or limited signal that is derived from the closed-loop system 146 of FIG. 5. Specifically, the closed-loop system 146 may measure a DC voltage of the electric drive 104 or common bus 118 and compare the measured voltage with a predefined nominal DC voltage thereof. Based on the difference between the measured and the nominal DC voltages, a raw torque command signal may be derived using, for example, a proportional-integral (PI) feedback control 148, or the like. Upon adjusting the torque command to the appropriate limits, the closed-loop system 146 may output a limited torque command signal that may be used while performing each of the single pulse and current regulation modes 142, 144 of operating the generator 110.

Referring back to FIG. 3, if the detected engine speed is relatively high, the controller 132 may transmit gate signals which engage a single pulse mode 142 of operating the generator 110. For example, the gate signals may continuously enable both of the switches 134 of the converter circuit 120 associated with each phase of the generator 110. The controller 132 may further determine an operational state of the electric drive 104 in a step S5. More specifically, based on the detected engine speed, the derived torque command, and the like, the controller 132 may determine whether the operational state of the electric drive 104 is in a transient or steady state. If the characteristics of the electric drive 104 are determined to be substantially constant for a predefined period of time, or in a steady state, the controller 132 may proceed to operate the generator 110 using a map-lookup control scheme 150 in a step S6. Alternatively, if the characteristics of the electric drive 104 are determined to be varying, or in a transient state, the controller 132 may proceed to operate the generator 110 according to a fixed-theta off control scheme 152 in a step S7.

Figure 6:
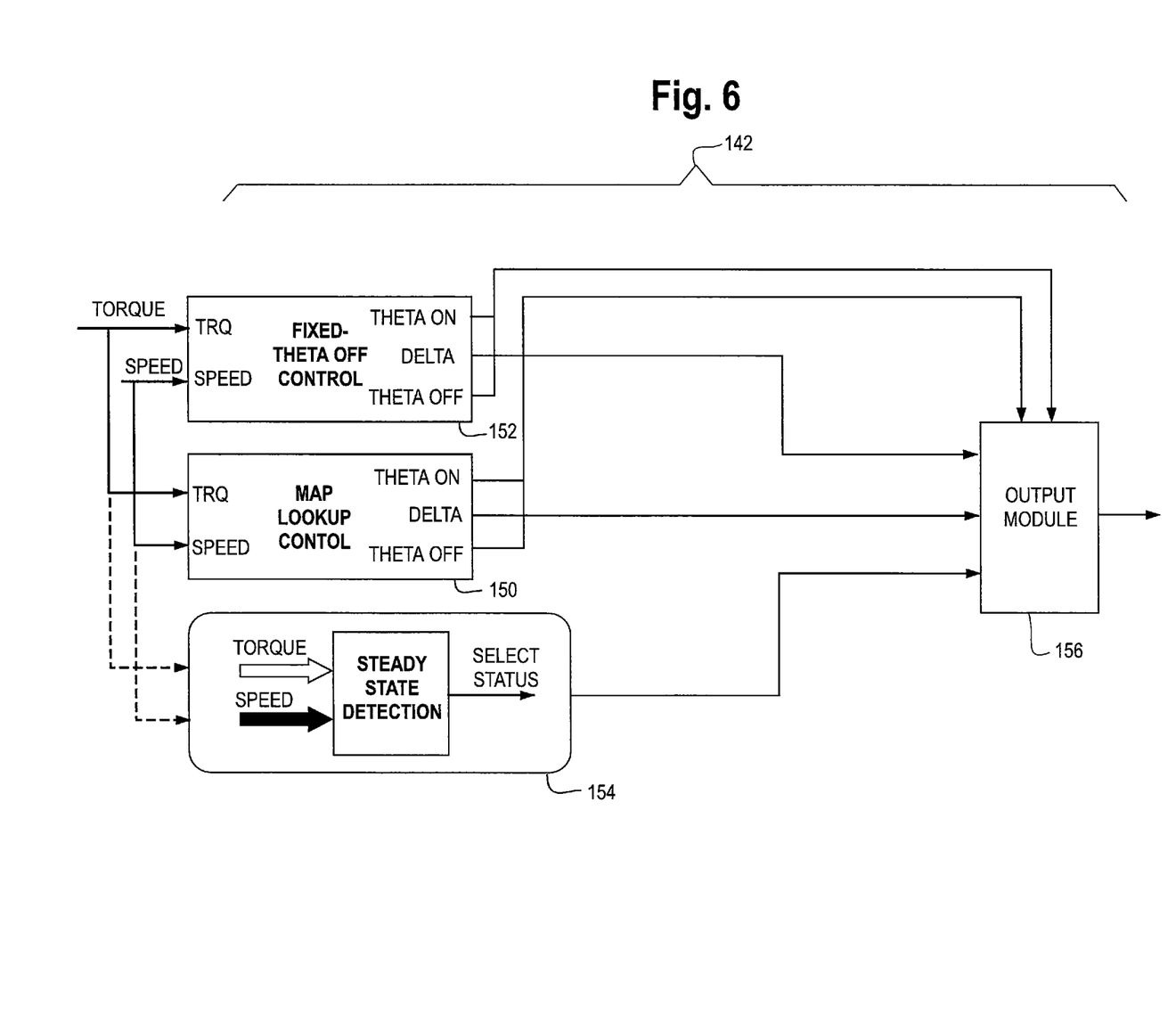
FIG. 6 is a schematic view of a single pulse mode of operating a generator.
Figure 7:
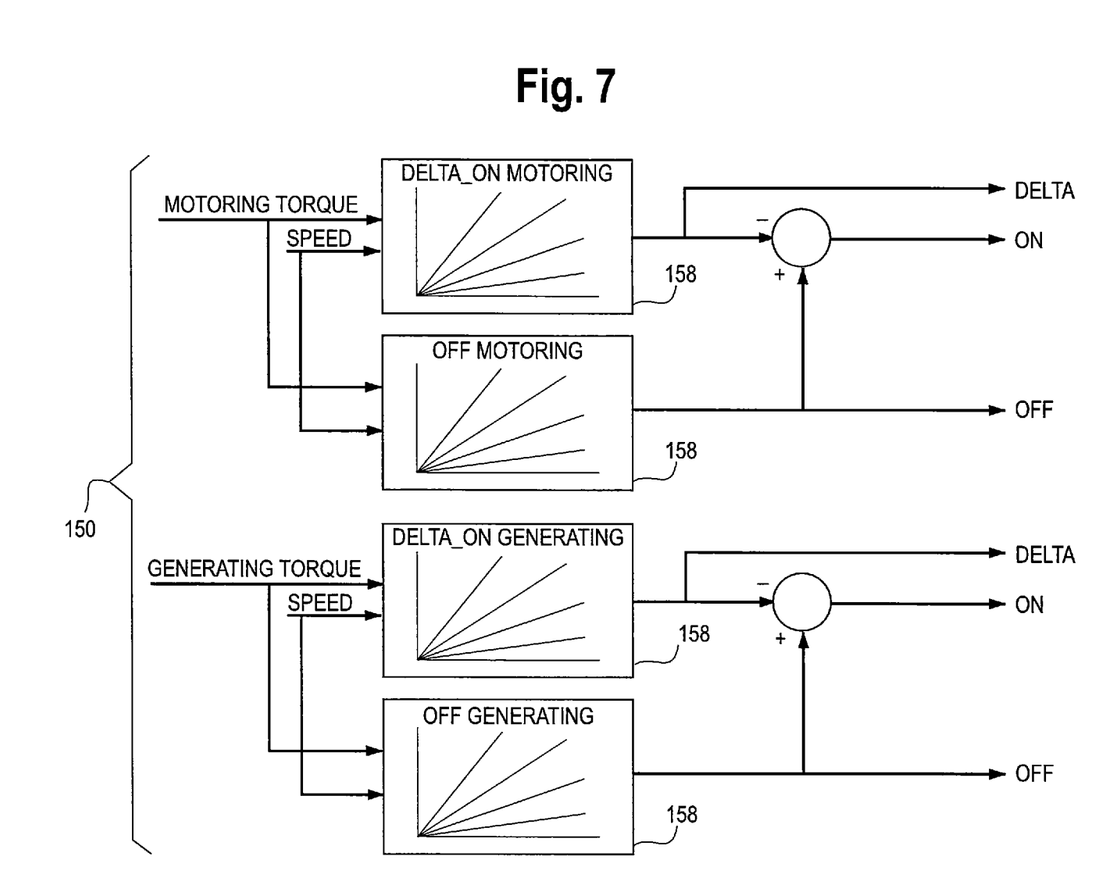
FIG. 7 is a schematic view of a map-lookup control scheme as applied to the single pulse mode of FIG. 6.

Turning now to FIG. 6, one exemplary embodiment for controlling a generator 110 in a single pulse mode 142 of operation is schematically illustrated. As shown, a single pulse mode 142 of operation may essentially include a map-lookup control module 150, a fixed-theta off control module 152, a steady state detection module 154, an output module 156, and the like. As further illustrated in FIG. 7, the map-lookup control module 150 may be preprogrammed with a plurality of control maps 158 which the controller 132 may use as reference for controlling the generator 110. More specifically, the control maps 158 may include predefined relationships between expected characteristics of the electric drive 104 and optimum generator controls corresponding to those characteristics. For example, based on the engine speed and torque command, the map-lookup control module 150 may select the most appropriate set of control maps 158 and output gate signals for controlling the generator 110 according to the selected control maps 158. The outputs provided by the map-lookup control module 150 may include information pertaining to, for example, the generator conduction angle, the ON angle, the OFF angle, and the like. In further modifications, the map-lookup control module 150 may include at least one set of control maps 158 corresponding to optimum generator controls for use during motoring operations, and at least one set of control maps 158 corresponding to optimum generator controls for use during generating operations.

Figure 8:
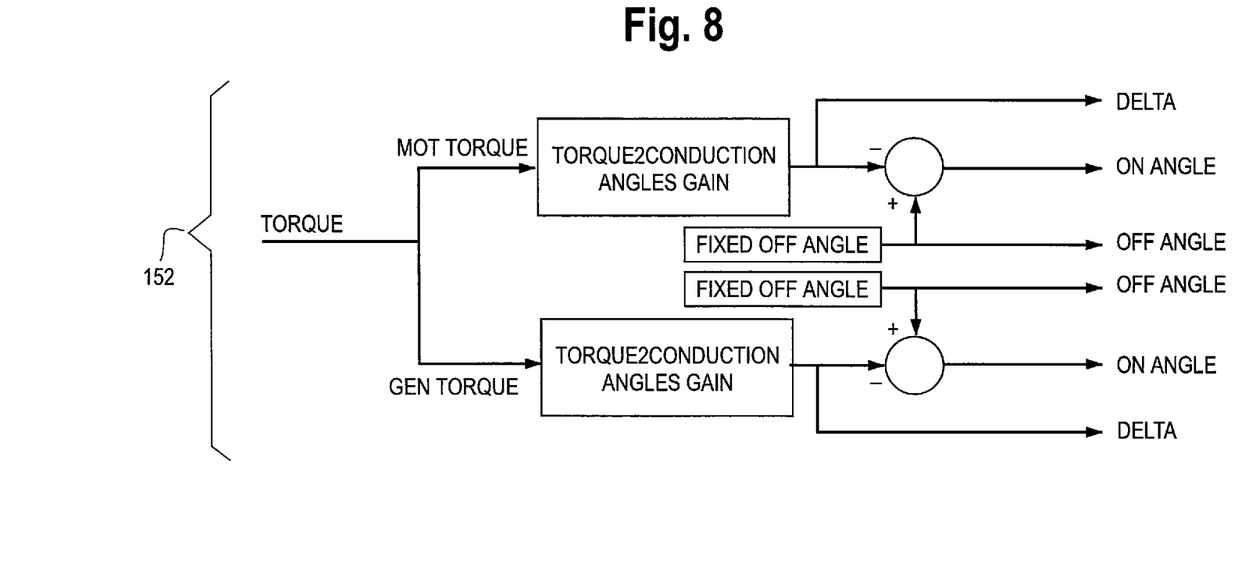
FIG. 8 is a schematic view of a fixed-theta off control scheme as applied to the single pulse mode of FIG. 6.

Although map-lookup control schemes 150 may be best suited for use during steady states of operation in which the behaviors of the electric drive 104 are easier to predict, the use of control maps 158 may prove inefficient and cumbersome when relied upon for transient states of operation. Accordingly, the fixed-theta off control module 152 of FIG. 6 may be configured to provide optimum generator controls during transient states without referring to control maps 158, or the like. Rather, the fixed-theta off control module 152 may provide generator controls which relate directly to the torque command as well as any detected change therein. Moreover, as the torque command is provided by continuous feedback from the measured DC voltage of the electric drive 104, the fixed-theta off control module 152 may ensure that optimum transient control of the generator 110 is provided. As further illustrated in FIG. 8, for example, the fixed-theta off control module 152 may be configured to provide a generator conduction angle and an ON angle which corresponds directly to the torque command received. The generator OFF angle may be fixed at a predefined angle regardless of the characteristics of the electric drive 104, or the associated torque command. In further modifications, the fixed-theta off control module 152 may provide the generator 110 with the appropriate conduction angle, ON angle, OFF angle, and the like, for use during motoring operations as well as during generating operations.

In the single pulse mode 142 of FIG. 6, both of the map-lookup and fixed-theta off control schemes 150, 152 may be simultaneously enabled to provide outputs for controlling the generator 110. The respective outputs may then be received by the output module 156. The detection module 154 may continuously or periodically monitor the engine speed, the torque command, or any other relevant characteristic of the electric drive 104, to determine if the electric drive 104 is in a steady state or in a transient state. If the detection module 154 determines a steady state condition, the detection module 154 may instruct the output module 156 to pass through only those generator control signals provided by the map-lookup control module 150. Alternatively, if the detection module 154 determines a transient state condition, the detection module 154 may instruct the output module to pass through only those generator control signals provided by the fixed-theta off control module 152. In further modifications, rather than simultaneously enabling both control modules 150, 152, the controller 132 may be configured to enable only one of the two control modules 150, 152 in response to the output provided by the detection module 154 so as to reduce the number of processes handled by the controller 132.

Figure 9:
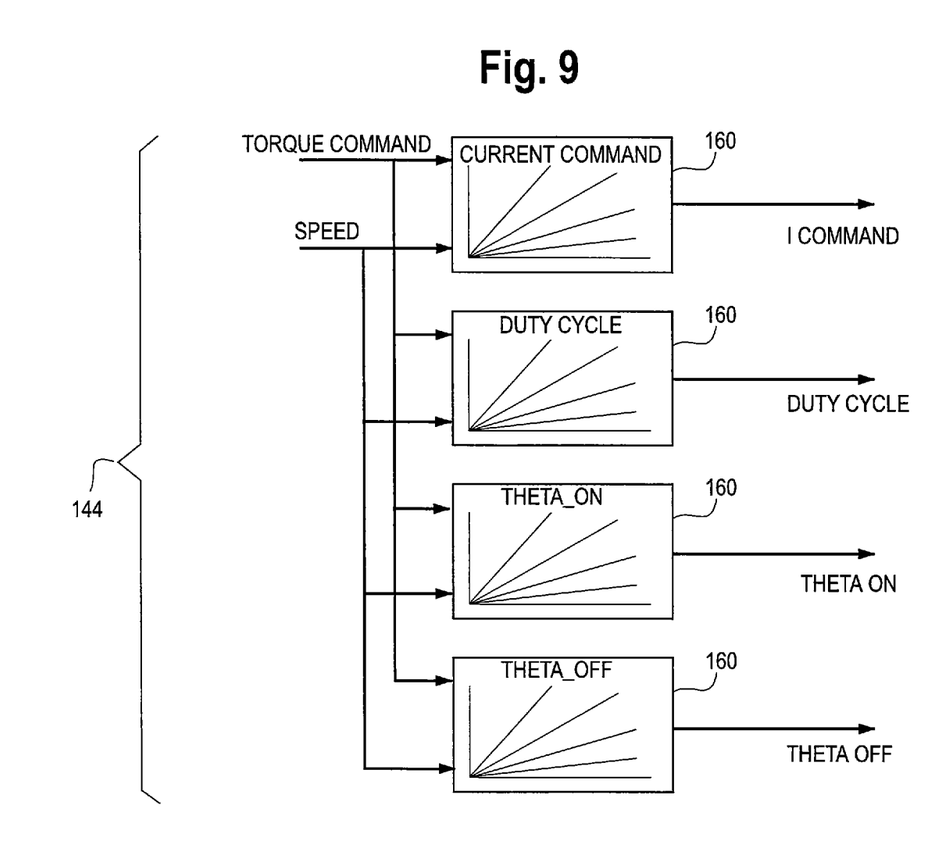
FIG. 9 is a schematic view of a map-lookup control scheme as applied to a current regulation mode of operating a generator.

Referring back to FIG. 3, if the detected engine speed corresponds to a nominal or a relatively low engine speed, the controller 132 may be configured to engage a current regulation mode 144 of operating the generator 110 in step S4, wherein one or both of the switches 134 associated with each phase of the generator 110 are enabled in a pulsing or chopping manner. Similar to step S6 of the single pulse mode 142, the controller 132 may refer to a plurality of control maps 160 to determine the ideal generator controls for use during current regulation mode 144 in a step S8. As shown in FIG. 9, for example, based on the engine speed and torque command, the controller 132 may select the most appropriate set of control maps 160, which may include information pertaining to a current command, a duty cycle, generator ON and OFF angles, and the like. The controller 132 may then provide outputs for controlling the generator 110 according to the selected control maps 160. In further modifications, the current regulation mode 144 may be configured with at least one set of control maps 160 for use during motoring operations, and at least one set of control maps 160 for use during generating operations. Additionally or optionally, the controller 132 may also be configured to determine whether the engine speed is relatively low or nominal. If the engine speed is determined to be relatively low, the controller 132 may enable a soft chopping current regulation mode of operating the generator 110. During soft chopping current regulation, for example, one of the two switches 134 of the converter circuit 120 associated with each phase of the generator 110 may be continuously enabled while the remaining switch 134 is pulsed or chopped. However, if the engine speed is determined to be nominal, the controller 132 may enable a hard chopping current regulation mode of operating the generator 110, wherein both of the switches 134 of the converter circuit 120 associated with each phase of the generator 110 are pulsed or chopped simultaneously.

INDUSTRIAL APPLICABILITY

In general, the foregoing disclosure finds utility in various industrial applications, such as the farming, construction and mining industries in providing more efficient control of generators typically used in association with work vehicles and/or machines, such as tractors, backhoe loaders, compactors, feller bunchers, forest machines, industrial loaders, skid steer loaders, wheel loaders, and the like. More specifically, the disclosed control systems and methods may be applied to electric drive assemblies and machines having switched reluctance generators or other comparable generators commonly used in the art. The systems and methods disclosed herein adaptively selects the most appropriate form of controlling a generator based on the state of the electric drive assembly. Specifically, a map-lookup control scheme is employed when the electric drive is in a steady state, and a fixed-theta off control scheme is employed when the electric drive is in a transient state. By allowing the generator to be controlled more efficiently in all conditions, reliability and efficiency of the electric drive assembly is greatly improved over the life of the associated work machine.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of controlling a generator of an electric drive associated with an engine, the method comprising the steps of:
    determining a mode of operating the generator based on a speed of the engine;
    engaging a single pulse mode of operating the generator if the engine speed is relatively high;
    engaging a current regulation mode of operating the generator if the engine speed is not relatively high;
    providing a first signal for operating the generator based on a map-lookup control scheme;
    providing a second signal for operating the generator based on a fixed-theta off control scheme;
    determining an operational state of the electric drive based on output characteristics of the engine; and
    selectively enabling one of the first and second signals for controlling the generator based on the detected operational state of the electric drive.

2. The method of claim 1, wherein the first signal is enabled if the operational state of the electric drive is in a steady state and the second signal is enabled if the operational state of the electric drive is in a transient state.

3. The method of claim 1, wherein the operational characteristics of the engine include one or more of engine speed, a torque command and a rate of change in engine speed.

4. The method of claim 1 further providing a third signal for operating the generator based on a map-lookup control scheme.

5. The method of claim 4 further enabling the third signal for controlling the generator if the current regulation mode is engaged.

6. The method of claim 1, wherein a soft chopping mode is engaged if the engine speed is relatively low.

7. The method of claim 1, wherein a hard chopping mode is engaged if the engine speed is nominal.

8. The method of claim 1, wherein the map-lookup control scheme is configured to control one or more phases of a stator of the generator according to at least one of a plurality of preprogrammed control maps.

9. The method of claim 1, wherein the fixed-theta off control scheme is configured to control one or more phases of a stator of the generator based at least partially on a closed-loop system configured to monitor common bus voltage.

* * * * *